United States Patent
Shepherd et al.

(10) Patent No.: US 6,503,866 B1
(45) Date of Patent: *Jan. 7, 2003

(54) ATTRITION RESISTANT CATALYST WITH REDUCED SURFACE AREA

(75) Inventors: Robin E. Shepherd, Haughton, LA (US); Mark D. Moser, Elk Grove Village, IL (US); John Y. G. Park, Naperville, IL (US); Andrzej Z. Ringwelski, Marengo, IL (US)

(73) Assignee: UOP LLC, Des Plaines, IL (US)

( * ) Notice: Subject to any disclaimer, the term of this patent is extended or adjusted under 35 U.S.C. 154(b) by 44 days.

This patent is subject to a terminal disclaimer.

(21) Appl. No.: 09/754,677

(22) Filed: Jan. 4, 2001

Related U.S. Application Data

(63) Continuation-in-part of application No. 09/586,829, filed on Jun. 5, 2000.

(51) Int. Cl.[7] ............... B01J 23/56; B01J 23/40; B01J 23/42; B01J 23/00; B01J 20/00
(52) U.S. Cl. ............. 502/332; 502/327; 502/334; 502/339; 502/355; 502/415; 502/439; 208/138
(58) Field of Search ............... 502/355, 415, 502/439, 527.15, 527.16, 327, 332, 333, 334, 339; 501/153; 208/138

(56) References Cited

U.S. PATENT DOCUMENTS

| | | | | |
|---|---|---|---|---|
| 3,920,615 A | | 11/1975 | Huang | 260/683.3 |
| 4,080,313 A | * | 3/1978 | Whittam | 252/455 R |
| 4,154,812 A | * | 5/1979 | Sanchez et al. | 423/626 |
| 4,179,408 A | * | 12/1979 | Sanchez et al. | 252/448 |
| 4,301,037 A | * | 11/1981 | Sanchez et al. | 252/462 |
| 4,371,513 A | * | 2/1983 | Sanchez et al. | 423/625 |
| 4,390,456 A | * | 6/1983 | Sanchez et al. | 252/448 |
| 4,483,693 A | | 11/1984 | White et al. | 48/213 |
| 4,522,935 A | * | 6/1985 | Robinson et al. | 502/223 |
| 4,529,505 A | * | 7/1985 | Robinson et al. | 208/139 |
| 4,677,094 A | * | 6/1987 | MOser et al. | 502/227 |
| 4,737,483 A | * | 4/1988 | Moser et al. | 502/227 |
| 4,755,499 A | * | 7/1988 | Neal et al. | 502/415 |
| 4,767,523 A | | 8/1988 | Kukes et al. | 208/217 |
| 4,820,676 A | | 4/1989 | Kukes et al. | 502/220 |
| 4,964,975 A | * | 10/1990 | Chao et al. | 208/139 |
| 5,229,347 A | * | 7/1993 | Prada et al. | 502/221 |
| 5,552,035 A | | 9/1996 | Potter et al. | 208/135 |
| 6,066,251 A | * | 5/2000 | Chen et al. | 208/138 |
| 6,214,764 B1 | * | 4/2001 | Gillespie | 502/230 |

FOREIGN PATENT DOCUMENTS

| | | | | |
|---|---|---|---|---|
| CA | 1020958 | 11/1977 | | 260/675.1 |

* cited by examiner

Primary Examiner—Steven P. Griffin
Assistant Examiner—Cam N. Nguyen
(74) Attorney, Agent, or Firm—John G. Tolomei; Frank S. Molinaro; Thomas K. McBride, Jr.

(57) ABSTRACT

A process for preparing a catalyst, the catalyst itself, and a process for using the catalyst are disclosed generally for the conversion of hydrocarbons. By the use of at least one high temperature calcination under substantially dry conditions, a catalyst with a beneficial combination of lowered surface area and excellent piece crush is created. X-ray diffraction pattern information is used to distinguish the resulting product.

20 Claims, 2 Drawing Sheets

ATTRITION RESISTANT CATALYST WITH REDUCED SURFACE AREA

CROSS REFERENCE TO RELATED APPLICATION

This application is a continuation-in-part of prior copending application Ser. No. 09/586,829 filed Jun. 5, 2000, the contents of which are incorporated herein by reference.

FIELD OF THE INVENTION

This invention relates to a process for preparing a reduced surface area shaped alumina catalyst that maintains a high level of piece crushing strength. The catalyst is prepared using a dry high temperature calcination.

BACKGROUND OF THE INVENTION

The controlled adjustment of a significant hydrocarbon conversion catalyst property of surface area has been found to be possible along with the maintenance and even improvement of another significant catalyst property of piece crushing strength. Surface area can allow acidic and metal supported reactions to occur, while piece crush strength permits catalyst particles to maintain their integrity, and thus their useful life.

U.S. Pat. No. 3,920,615 (Huang) discloses a calcination treatment of at least 800° C. which is used to reduce the surface area of an alumina catalyst to between 10 m²/gm and 150 m²/gm. The catalyst displays improved selectivity in a process for long chain mono-olefin dehydrogenation from paraffins as part of the production of alkylaryl sulfonates. No mention is made to the resulting piece crushing strength from the procedure.

Canadian Patent No. 1,020,958 (Masologites) discloses a catalyst consisting of at least one platinum group component used in a reaction zone with a hydrocarbon and hydrogen under conditions causing coke deposition on the catalyst. It is regenerated by oxidation and the process repeated until the surface area is between 20 and 90% of the original value. The catalyst is then treated to incorporate at least one promoter metal selected from the group of Re, Ge, Ir, Sn, Au, Cd, Pb, rare earths, or a mixture thereof. The resulting catalyst shows increased stability in use thus requiring less frequent regeneration or replacement. Again no mention is made as to the resulting piece crushing strength from this procedure.

Applicants have found that piece crushing strength is a very important property for catalysts. This has been recognized in the art pertaining to hydrotreatment as disclosed in U.S. Pat. Nos. 4,767,523 and 4,820,676 (Kukes et al.) where a solution of ammonium sulfate is used to treat alumina such that after calcination its strength is increased when measured under high pressure fixed bed hydrotreating conditions.

Piece crushing strength is an even more important property for moving bed applications. When catalyst particles are moving through a reaction zone, higher piece crushing strength leads to less catalyst attrition and deterioration to fines. Catalysts with poor strength more often fracture, generating dust and catalyst fines that can become trapped against reactor screens. This can lead to blocked flow of reactants and products, which often may require a reforming unit to shut down for screen cleaning. Many commercial moving bed systems require catalyst make up in order to replace catalyst inventory lost to fines, dust, or cracked chips.

U.S. Pat. No. 5,552,035 (Potter et al.) discloses a method for hydro-thermally calcining an extruded bound zeolitic catalyst that can be used in a fixed bed reforming process, where calcination improves catalyst strength. In contrast to Potter et al., applicants have found that dry calcination gives even better %, retention of catalyst strength. By studying the controlled use of steam as part of state-of-the-art Potter et al. disclosed hydro-thermal calcination evaluation, a surprising result was obtained by removing the disclosed 30 volume % to 100 volume % water from the calcination atmosphere. In fact it was found that this water was causing substantial loss of piece crushing strength in achieving a desired reduction in catalyst surface area. By conducting a calcination at substantially dry conditions such that the moisture level remains less than 4 mass %, and preferably less than 3 mass %, an excellent combination of piece crushing strength and reduced surface area was obtained.

U.S. Pat. No. 4,483,693 (White et al.) discloses a process for steam reforming of hydrocarbons in the presence of greater than 1 ppm sulfur using a catalyst comprising an alumina with a surface area from about 30 to about 160 m2/g formed by calcination of pure single phase boehmite. No information is provided regarding calcination water content or catalyst strength.

SUMMARY OF THE INVENTION

It is an object of this invention to provide a process for preparation of a novel and useful catalyst with reduced surface area and high piece crushing strength.

A broad embodiment of the present invention is a process for preparing a shaped catalyst comprising an alumina support where the catalyst is treated with a dry high temperature calcination at a time and temperature sufficient to produce a catalyst with a surface area from about 150 m2/gm to about 180 m2/gm and a piece crush strength of at least 40 N/mm. This amounts to a surface area reduction from about 5% to about 30% of the original support as analyzed prior to the dry high temperature calcination with a concomitant maintenance of piece crush strength of greater than 95% of the original support as analyzed prior to the dry high temperature calcination. The catalyst is characterized with a X-ray powder diffraction pattern such that the ratio of peak intensities at respective two-- Bragg angle values of 34.0:32.5 is at least about 1.2 and the ratio of peak intensities at respective two-- Bragg angle values of 46.0:45.5 is at most about 1.1.

The calcination conditions comprise a temperature from about 700° C. to about 900° C., a moisture level of less than 4 mass % steam and a time limit of about 15 minutes to about 20 hours. A preferred calcination condition comprises a temperature from about 800° C. to about 900° C., a moisture level of less than 3 mass % steam and a time limit of about 30 minutes to about 6 hours.

Optionally, the catalyst has at least one platinum group metal dispersed thereon along with a halogen component, especially chlorine, and perhaps an additional element such as tin.

The preferred form of alumina is substantially gamma phase alumina based on high purity pseudoboehmite alumina powder or alumina hydrosol. The preferred shape is either substantially cylindrical or substantially spherical.

The product prepared by this process is preferably used in a moving bed catalytic reforming process for converting hydrocarbons in the presence of less than 1 ppm sulfur.

These as well as other objects and embodiments will become apparent upon a reading of the following detailed description of the invention.

DETAILED DESCRIPTION OF THE INVENTION

Figure 1:
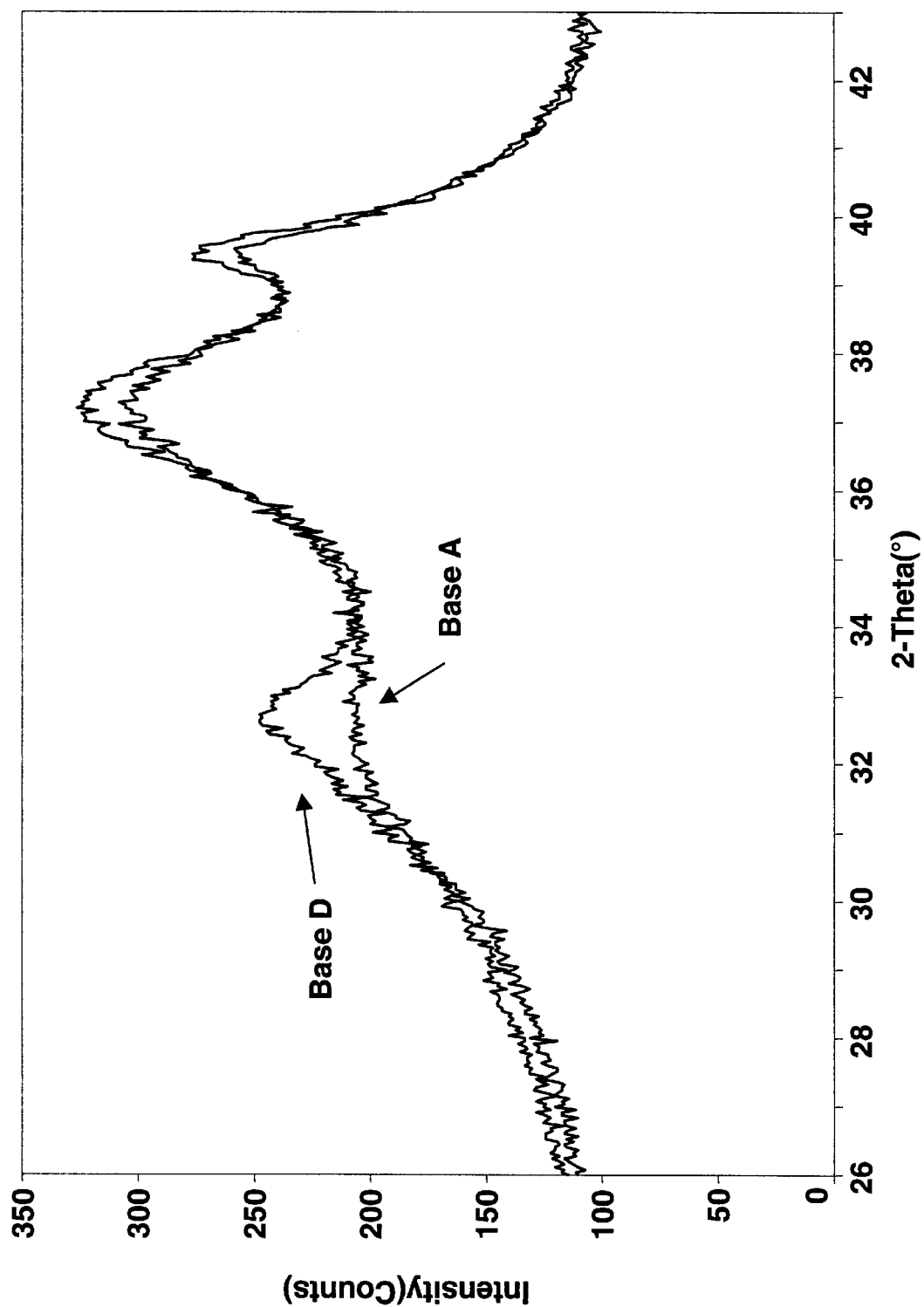
FIG. 1 shows an X-ray diffraction pattern for a catalyst of the invention (Base D) compared to a reference (Base A) over the range 2-theta 43 to 26.

A broad embodiment of the present invention, therefore, is a process for preparing a shaped alumina catalyst comprising providing shaped alumina particles substantially in the gamma phase and calcining at a time, temperature, and moisture level sufficient to produce a catalyst with a desirable surface area and excellent piece crush strength.

Suitable alumina materials are the crystalline aluminas known as the gamma, eta, and theta phase aluminas, with gamma or eta phase aluminas giving best results. A preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, such an alumina will be hereinafter referred to as a "Ziegler alumina". Ziegler alumina is presently available from the Vista Chemical Company under the trademark "Catapal" or from Condea Chemie GmbH under the trademark "Pural." This material is an extremely high purity pseudoboehmite which, after calcination at a high temperature, has been shown to yield a high purity gamma-alumina.

The preferred form of the present catalyst support is a sphere. Alumina spheres may be continuously manufactured by the well known oil-drop method which comprises: forming an alumina slurry with Ziegler alumina or an alumina hydrosol by any of the techniques taught in the art and preferably by reacting aluminum metal with hydrochloric acid; combining the resulting hydrosol or slurry with a suitable gelling agent; and dropping the resultant mixture into an oil bath maintained at elevated temperatures. The droplets of the mixture remain in the oil bath until they set and form gelled spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° C. to about 205° C. and subjected to a calcination procedure at a temperature of about 450° C. to about 700° C. for a period of about 1 to about 20 hours. This treatment effects conversion of the alumina hydrogel to the corresponding crystalline gamma-alumina. U.S. Pat. No. 2,620,314 provides for additional details and is incorporated herein by reference thereto. The use of the term substantially spherical refers to the geometric properties of most of the spheres being round and includes slight deviations.

A substantially cylindrical catalyst, defined with geometric properties of most of the cylinders being circular in one direction and linear in another, and including slight deviations therefrom, can be prepared by any of the well known forming methods such as extrusion known in the art. The preferred extrudate form is prepared by mixing Ziegler alumina powder with water and suitable peptizing agents, such as nitric acid, acetic acid, aluminum nitrate and like materials, to form an extrudable dough having a loss on ignition (LOI) at 500° C. of about 45 to about 65 mass-%. The resulting dough is extruded through a suitably shaped and sized die to form extrudate particles, which can be dried at a relatively low temperature of about 150° C. to about 205° C and subjected to a calcination procedure at a temperature of about 450° C. to about 700° C. for a period of about 1 to about 20 hours. Alternatively, spherical particles can be formed from the extrudates by rolling the extrudate particles on a spinning disk.

Average particle diameter can vary from 1 mm to 10 mm, with the preferred particle diameter being approximately 3 mm.

An optional ingredient of the catalyst is a platinum-group-metal component. This component comprises platinum, palladium, ruthenium, rhodium, iridium, osmium or mixtures thereof, with platinum being preferred. The platinum-group metal may exist within the final catalytic composite as a compound such as an oxide, sulfide, halide, oxyhalide, etc., in chemical combination with one or more of the other ingredients of the composite or as an elemental metal. Best results are obtained when substantially all of this component is present in the elemental state and it is homogeneously dispersed within the carrier material. This component may be present in the final catalyst composite in any amount which is catalytically effective; the platinum-group metal generally will comprise about 0.01 to about 2 mass % of the final catalytic composite, calculated on an elemental basis. Excellent results are obtained when the catalyst contains about 0.05 to about 1 mass % of platinum.

The platinum-group metal component may be incorporated in the support in any suitable manner, such as coprecipitation, ion-exchange or impregnation. The preferred method of preparing the catalyst involves the utilization of a soluble, decomposable compound of platinum-group metal to impregnate the carrier material in a relatively uniform manner. For example, the component may be added to the support by commingling the latter with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic or chloropalladic acid or rhodium trichloride hydrate, is preferred since it facilitates the incorporation of both the platinum-group-metal component and at least a minor quantity of the preferred halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after it has been calcined in order to minimize the risk of washing away the valuable platinum-group metal.

Generally the platinum-group metal component is dispersed homogeneously in the catalyst. Homogeneous dispersion of the platinum-group metal preferably is determined by Scanning Transmission Electron Microscopy (STEM), comparing metals concentrations with overall catalyst metal content. In an alternative embodiment one or more platinum-group metal components may be present as a surface-layer component as described in U.S. Pat. No. 4,677,094, incorporated by reference. The "surface layer" is the layer of a catalyst particle adjacent to the surface of the particle, and the concentration of surface-layer metal tapers off in progressing from the surface to the center of the catalyst particle.

A Group IVA(IUPAC 14) metal component is an optional ingredient of the catalyst of the present invention. Of the Group IVA(IUPAC 14) metals, germanium and tin are preferred and tin is especially preferred. This component may be present as an elemental metal, as a chemical compound such as the oxide, sulfide, halide, oxychloride, etc., or as a physical or chemical combination with the porous carrier material and/or other components of the catalytic composite. Preferably, a substantial portion of the Group IVA(IUPAC 14) metal exists in the finished catalyst in an oxidation state above that of the elemental metal. The Group IVA(IUPAC 14) metal component optimally is utilized in an amount sufficient to result in a final catalytic composite containing about 0.01 to about 5 mass % metal, calculated on an elemental basis, with best results obtained at a level of about 0.1 to about 2 mass % metal.

The Group IVA(IUPAC 14) metal component may be incorporated in the catalyst in any suitable manner to achieve a homogeneous dispersion, such as by coprecipitation with the porous carrier material, ion-exchange with the carrier material or impregnation of the carrier material at any stage in the preparation. One method of incorporating the Group IVA(IUPAC 14) metal component into the catalyst composite involves the utilization of a soluble, decomposable compound of a Group IVA(IUPAC 14) metal to impregnate and disperse the metal throughout the porous carrier material. The Group IVA(IUPAC 14) metal component can be impregnated either prior to, simultaneously with, or after the other components are added to the carrier material. Thus, the Group IVA(IUPAC 14) metal component may be added to the carrier material by commingling the latter with an aqueous solution of a suitable metal salt or soluble compound such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds. The utilization of Group IVA(IUPAC 14) metal chloride compounds, such as stannic chloride, germanium tetrachloride or lead chlorate is particularly preferred since it facilitates the incorporation of both the metal component and at least a minor amount of the preferred halogen component in a single step. When combined with hydrogen chloride during the especially preferred alumina peptization step described hereinabove, a homogeneous dispersion of the Group IVA(IUPAC 14) metal component is obtained in accordance with the present invention. In an alternative embodiment, organic metal compounds such as trimethyltin chloride and dimethyltin dichloride are incorporated into the catalyst during the peptization of the inorganic oxide binder, and most preferably during peptization of alumina with hydrogen chloride or nitric acid.

Optionally the catalyst may also contain other components or mixtures thereof which act alone or in concert as catalyst modifiers to improve activity, selectivity or stability. Some known catalyst modifiers include rhenium, gallium, cerium, lanthanum, europium, indium, phosphorous, nickel, iron, tungsten, molybdenum, zinc, and cadmium. Catalytically effective amounts of these components may be added in any suitable manner to the carrier material during or after its preparation or to the catalytic composite before, while or after other components are being incorporated. Generally, good results are obtained when these components constitute about 0.01 to about 5 mass % of the composite, calculated on an elemental basis of each component.

Another optional component of the catalyst, particularly useful in hydrocarbon conversion processes comprising dehydrogenation, dehydrocyclization, or hydrogenation reactions, is an alkali or alkaline-earth metal component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained when this component constitutes about 0.01 to about 5 mass % of the composite, calculated on an elemental basis. This optional alkali or alkaline earth metal component can be incorporated into the composite in any of the known ways with impregnation with an aqueous solution of a suitable water-soluble, decomposable compound being preferred.

As heretofore indicated, it is necessary to employ at least one oxidation step in the preparation of the catalyst. An essential step of the invention is a high temperature oxidation step, also called a calcination step, which preferably takes place after a first oxidation step at a lower temperature and an optional halogen adjustment step. This high temperature calcination step is distinguished by taking place at a low and controlled moisture level consisting of less than 4 mass % steam, and preferably less than 3 mass % steam.

The conditions employed to effect the first calcination step are selected to convert substantially all of the metallic components within the catalytic composite to their corresponding oxide form. The calcination step typically takes place at a temperature of from about 370° to about 600° C. An oxygen atmosphere is employed typically comprising air. Generally, the oxidation step will be carried out for a period of from about 0.5 to about 10 hours or more, the exact period of time being that required to convert substantially all of the metallic components to their corresponding oxide form. This time will, of course, vary with the calcination temperature employed and the oxygen content of the atmosphere employed.

In addition to the calcination step, a halogen adjustment step may also be employed in preparing the catalyst. The halogen adjustment step may serve a dual function. First, the halogen adjustment step may aid in homogeneous dispersion of the Group IVA(IUPAC 14) metal and other metal component. Additionally, the halogen adjustment step can serve as a means of incorporating the desired level of halogen into the final catalytic composite. The halogen adjustment step employs a halogen or halogen-containing compound in air or an oxygen atmosphere. Since the preferred halogen for incorporation into the catalytic composite comprises chlorine, the preferred halogen or halogen-containing compound utilized during the halogen adjustment step is chlorine, HCl or precursor of these compounds. In carrying out the halogen adjustment step, the catalytic composite is contacted with the halogen or halogen-containing compound in air or an oxygen atmosphere at an elevated temperature of from about 370° C. to about 600° C. It is further desired to have water present during the contacting step in order to aid in the adjustment. In particular, when the halogen component of the catalyst comprises chlorine, it is preferred to use a mole ratio of water to HCl of about 5:1 to about 100:1. The duration of the halogenation step is typically from about 0.5 to about 5 hours or more. Because of the similarity of conditions, the halogen adjustment step may take place during the oxidation step. Alternatively, the halogen adjustment step may be performed before or after the calcination step as required by the particular method being employed to prepare the catalyst of the invention. Irrespective of the exact halogen adjustment step employed, the halogen content of the final catalyst should be such that there is sufficient halogen to comprise, on an elemental basis, from about 0.1 to about 10 mass % of the finished composite.

The dry high temperature calcination step of preparing the catalyst is conducted at conditions selected to create a product with desired physical properties in terms of surface area and piece crushing strength. This calcination step typically takes place at a temperature of from about 700° C. to about 900° C., a moisture level of less than 4 mass % steam and a time of about 15 minutes to about 20 hours. Preferably the calcination conditions comprise a temperature from about 800° C. to about 900° C., a moisture level of less than 3 mass % steam and a time limit of about 30 minutes to about 6 hours. An oxygen atmosphere is employed typically comprising dry air. Dry air is considered air with no added moisture or steam, ranging from air that has been dried using chemical means such as molecular sieves or silica gels to ambient moisture levels. Generally the exact period of time being that required to reach the desired physical properties of a surface area between about 150 $m^2/gm$ and about 180 $m^2/gm$ (measured by BET/N2 method, ASTM D3037, or equivalent) and a piece crushing strength at least 40 N/mm (average reported by ASTM D4179 or equivalent). Alternatively, since the material prior to the dry highs temperature calcination generally has a surface area between 200 and 220 $m^2/gm$, the relative amount of surface area reduction will be approximately between about 5 to about 30%. Further, the piece crush strength will be reduced at most to about 95% of the original value. The piece strength can also increase due to this calcination such that greater than a 100% of the original value may be obtained. This time will, of course, vary with the calcination temperature employed and the oxygen content of the atmosphere employed.

In preparing the catalyst, a reduction step may also be optionally employed. The reduction step is designed to reduce substantially all of the platinum-group metal component to the corresponding elemental metallic state and to ensure a relatively uniform and finely divided dispersion of this component throughout the refractory inorganic oxide. It is preferred that the reduction step takes place in a substantially water-free environment. Preferably, the reducing gas is substantially pure, dry hydrogen (i.e., less than 20 volume ppm water). However, other reducing gases may be employed such as CO, nitrogen, etc. Typically, the reducing gas is contacted with the oxidized catalytic composite at conditions including a reduction temperature of from about 315° to about 650° C. for a period of time of from about 0.5 to 10 or more hours effective to reduce substantially all of the platinum-group metal component to the elemental metallic state. The reduction step may be performed prior to loading the catalytic composite into the hydrocarbon conversion zone or it may be performed in situ as part of a hydrocarbon conversion process start-up procedure and/or during reforming of the hydrocarbon feedstock. However, if this in-situ technique is employed, proper precautions must be taken to predry the hydrocarbon conversion plant to a substantially water-free state and a substantially water-free hydrogen-containing reduction gas should be employed.

Optionally, the catalytic composite may also be subjected to a presulfiding step. The optional sulfur component may be incorporated into the catalyst by any known technique.

The catalyst of the present invention has particular utility as a hydrocarbon conversion catalyst. The hydrocarbon which is to be converted is contacted with the catalyst at hydrocarbon-conversion conditions, which include a temperature of from 40° C. to 550° C., a pressure of from atmospheric to 200 atmospheres absolute and liquid hourly space velocities from about 0.1 to 100 $hr^{-1}$. The catalyst is particularly suitable for catalytic reforming of gasoline-range feedstocks, and also may be used for dehydrocyclization, isomerization of aliphatics and aromatics, dehydrogenation, hydrocracking, disproportionation, dealkylation, alkylation, transalkylation, oligomerization, and other hydrocarbon conversions. When used to process gasoline-range feedstock as a catalytic reforming catalyst, this invention provides greater stability and lowered coke production relative to other catalysts known to the art.

Best results are achieved when the catalyst has an X-ray diffraction pattern showing characteristic intensities of peaks at specified Bragg angle positions. Specifically, the preferred catalyst has an X-ray powder diffraction pattern such that the ratio of peak intensities at respective two-$\Theta$ Bragg angle positions of about 34.0:32.5 is at least about 1.2 and the ratio of peak intensities at respective two-$\Theta$ Bragg angle values of about 46.0:45.5 is at most about 1.1. The X-ray pattern may be obtained by standard X-ray powder diffraction techniques, of which a suitable example is described hereinbelow. Typically, the radiation source is a high-intensity, copper-target, X-ray tube operated at 45 KV and 35 mA. Flat compressed powder samples illustratively are scanned in a continuous mode with a step size of 0.030° and a dwell time of 9.0 seconds on a computer-controller diffractometer. The diffraction pattern from the copper K radiation may be recorded with a Peltier effect cooled solid-state detector. The data suitably are stored in digital format in the controlling computer. The peak heights and peak positions are read from the computer plot as a function of two times theta (two-$\Theta$), where theta is the Bragg angle.

EXAMPLE

The following examples will serve to illustrate certain specific embodiments of the present invention. These examples should not, however, be construed as limiting the scope of the invention as set forth in the claims. There are many possible other variations, as those of ordinary skill in the art will recognize, which are within the spirit of the invention.

Example I

A commercially produced, spherical gamma alumina base (Base A), containing 0.3 mass % tin, had an initial surface area of 215 $m^2/gm$. The piece crushing strength of this support was 36.4 N/mm. The apparent bulk density (ABD) of this base was 0.5 grams/cc. This base was subsequently calcined by two methods. The first method, a standard steaming at elevated temperature to lower the surface area, produced Base B, properties of which are listed below. Base C was produced to illustrate the invention. This involved subjecting a layer of support to high temperature calcination in dry air. The moisture level for this experiment was approximately 2.5 mass % water.

|  | Base B (725° C. calcination, 40 mass % steam in air for 4 hours) | Base C (843° C. dry calcination in air for 1.5 hours) |
|---|---|---|
| Surface Area m²/gm | 160.1 | 160 |
| Piece Crush Strength, N | 23.6 | 40.4 |

Base C has retained significantly greater mechanical strength although the surface area has been reduced by 55 m²/gm. In surprising contrast, the support that was calcined with steam to the same 160 m²/gm surface area, lost mechanical strength. An approximate 30% reduction in piece crush strength is noted for the steamed base, while the dry calcination does not negatively affect the piece crush strength.

Example II

The commercially produced, spherical gamma alumina Base A from example I was used to prepare an additional base (Base D), by calcining Base A in dry air containing approximately 2.5 mass % water at 860° C. for 45 minutes.

Figure 2:
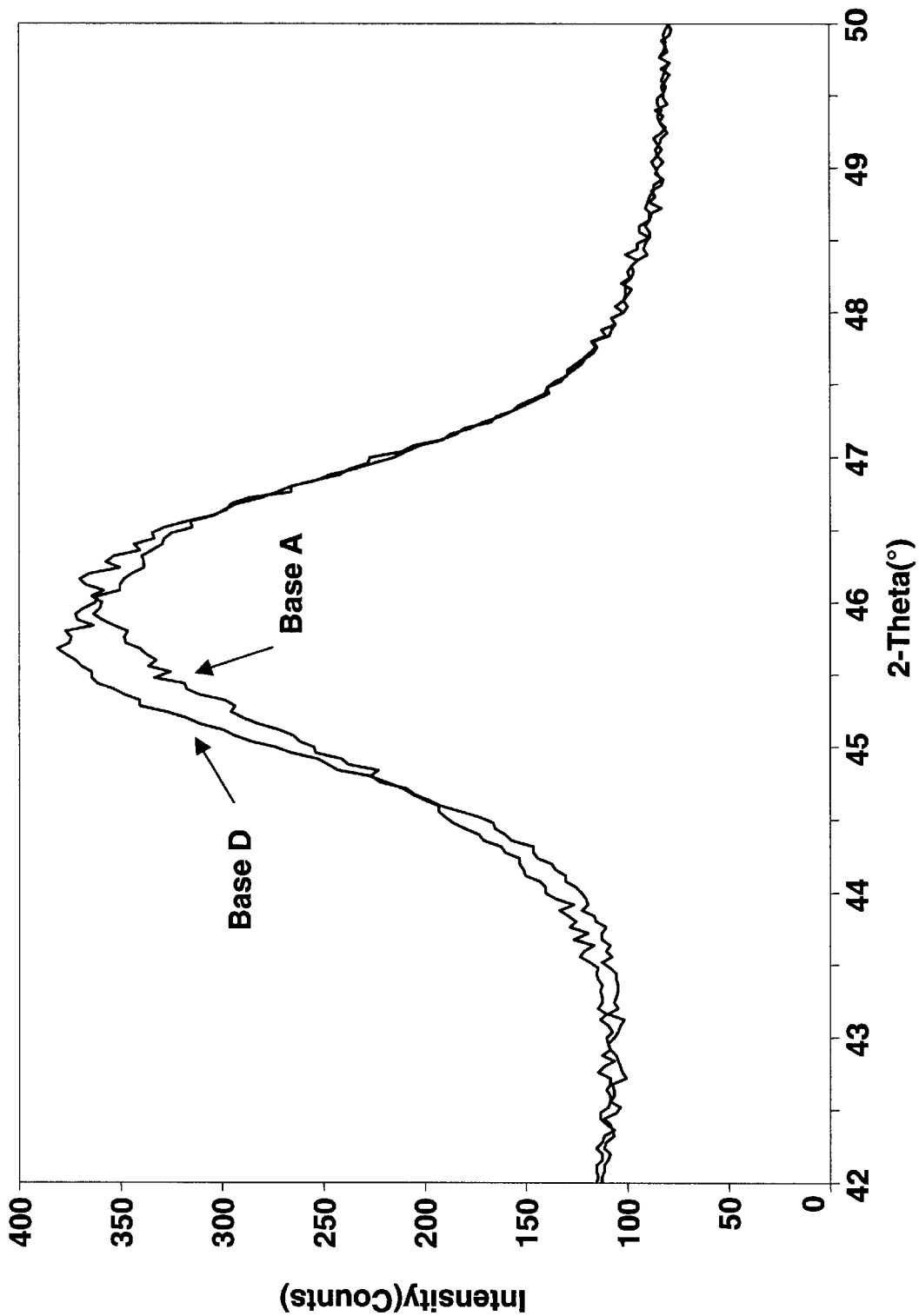
FIG. 2 shows an X-ray diffraction pattern for a catalyst of the invention (Base D) compared to a reference (Base A) over the range 2-theta 50 to 42.

The X-ray diffraction pattern of Base A and Base D were obtained by standard X-ray powder techniques. The diffraction pattern from 43 two-(−) to 26 two-(−) is shown in FIG. 1 and from 50 two-(−) to 42 two-(−) is shown in FIG. 2. These patterns show that the catalyst of the invention is unique from conventional gamma alumina. Particularly, FIG. 1 shows a broad peak near 33 two-(−), and FIG. 2 shows a peak near 46 two-(−) is left shifted. The peaks were characterized by taking ratios of peak intensities. The ratio of peak intensities at respective two-(−) Bragg angle values of about 34.0:32.5 and about 46.0:45.5 were determined to be about 0 and 1.1 for Base A and about 1.4 and 1.0 for Base D.

We claim as our invention:

1. A process of preparing a shaped alumina catalyst comprising providing shaped alumina particles substantially in the gamma phase and calcining the particles at a temperature from about 700° C. to about 900° C. or a time of about 15 minutes to about 20 hours, under substantially dry conditions consisting of a moisture level of less than 4 mass-% steam, to give a catalyst comprising alumina having a surface area from about 150 m²/gm to about 180 m²/gm, a piece crush strength of greater than 40 N/mm, and an X-ray powder diffraction pattern such that the ratio of peak intensities at respective two-(−) Bragg angle values of 34.0:32.5 is at least about 1.2 and the ratio of peak intensities at respective two-(−) Bragg angle values of 46.0:45.5 is at most about 1.1.

2. The process of claim 1 further comprising at least one platinum group metal dispersed onto the catalyst in an amount from about 0.01 mass-% to about 3.0 mass-% of the catalyst calculated on an elemental basis.

3. The process of claim 1 wherein the shaped alumina particles are substantially spherical.

4. The process of claim 1 wherein the shaped alumina particles are shaped from an alumina source selected from the group consisting of high purity pseudoboehmite alumina powder, alumina hydrosol and mixtures thereof.

5. The process of claim 1 wherein the calcination temperature range is from about 800° C. to about 900° C., the time varies from about 30 minutes to about 6 hours, and the moisture level is less than 3 mass-% steam.

6. A process of preparing a substantially spherical alumina catalyst comprising:

a) introducing a mixture comprising alumina hydrosol and a gelling agent into an oil bath at forming conditions to form gelled spheres;

b) drying and calcining the gelled spheres at drying and calcining conditions to form substantially spherical gamma alumina particles, wherein the calcining conditions comprise a temperature from about 450° C. to about 700° C. for a period of about 1 to about 20 hours;

c) calcining the spherical gamma alumina particles under conditions comprising a temperature from about 700° C. to about 900° C., for about 15 minutes to about 20 hours, under substantially dry conditions consisting of a moisture level of less than 4 mass-% steam;

d) dispersing onto the spherical alumina particles of (c) at least one platinum group metal to give about 0.01 to about 2 mass-% of the catalyst calculated on an elemental basis;

to give a catalyst comprising alumina having a surface area from about 150 m²/gm to about 180 m²/gm, a piece crush strength of greater than 40 N/mm, and an X-ray powder diffraction pattern such that the ratio of peak intensities at respective two-(−) Bragg angle values of 34.0:32.5 is at least about 1.2 and the ratio of peak intensities at respective two-(−) Bragg angle values of 46.0:45.5 is at most about 1.1.

7. The process of claim 6 wherein the calcination temperature range of step (c) is from about 800° C. to about 900° C., the time is from about 20 minutes to about 6 hours, and the moisture level is at less than 3 mass-% steam.

8. The product of the process of claim 6.

9. A spherical hydrocarbon conversion catalyst comprising calcined alumina having a surface area from about 150 m²/gm to about 180 m²/gm, a piece crush strength of greater than 40 N/mm, and an X-ray powder diffraction pattern such that the ratio of peak intensities at respective two-(−) Bragg angle values of 3.0:32.5 is at least about 1.2 and the ratio of peak intensities at respective two-(−) Bragg angle values of 46.0:45.5 is at most about 1.1.

10. The catalyst of claim 9 further comprising at least one platinum group metal dispersed onto the catalyst in an amount from about 0.01 mass-% to about 3.0 mass-% of the catalyst calculated on an elemental basis.

11. The catalyst of claim 10 wherein the platinum group metal is platinum.

12. The catalyst of claim 10 further comprising a metal promoter component selected from the group consisting of rhenium, tin, germanium, cerium, europium, indium, phosphorus, and mixtures thereof, wherein the metal promoter comprises from about 0.01 mass-% to about 5.0 mass-% of the catalyst calculated on an elemental basis.

13. The catalyst of claim 12 wherein the metal promoter component is tin.

14. The catalyst of claim 10 further comprising a halogen component present in an amount from about 0.1 mass-% to about 10 mass-% of the catalyst calculated on an elemental basis.

15. The catalyst of claim 14 wherein the halogen component is chlorine.

16. A hydrocarbon conversion process comprising contacting a hydrocarbon feedstock with a catalyst at hydrocarbon-conversion conditions to give a converted hydrocarbon, the catalyst comprising calcined alumina having a surface area from about 150 m²/gm to about 180 m²/gm, a piece crush strength of greater than 40 N/mm, and an X-ray powder diffraction pattern such that the ratio of peak intensities at respective two-(−) Bragg angle values of 34.0:32.5 is at least about 1.2 and the ratio of peak intensities at respective two-(−) Bragg angle values of 46.0:45.5 is at most about 1.1.

17. The process of claim 16 wherein the hydrocarbon-conversion conditions include a temperature of; from 40° C.

to 550° C., a pressure of from atmospheric to 200 atmospheres absolute and liquid hourly space velocities from about 0.1 to 100 hr−1.

18. The process of claim 16 wherein the catalyst further comprises at least one platinum group metal dispersed onto the catalyst in an amount from about 0.01 mass-% to about 3.0 mass-% of the catalyst calculated on an elemental basis.

19. The process of claim 16 wherein the hydrocarbon feedstock is a gasoline-range feedstock with a sulfur content less than 1 part per million.

20. The process of claim 19 where the process is a moving bed catalytic reforming process.

* * * * *